United States Patent
Donley et al.

(10) Patent No.: US 8,606,999 B2
(45) Date of Patent: Dec. 10, 2013

(54) CACHE PARTITIONING

(75) Inventors: Greggory D. Donley, San Jose, CA (US); William Alexander Hughes, San Jose, CA (US); Narsing K. Vijayrao, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 295 days.

(21) Appl. No.: 12/871,108

(22) Filed: Aug. 30, 2010

(65) Prior Publication Data

US 2012/0042127 A1    Feb. 16, 2012

Related U.S. Application Data

(60) Provisional application No. 61/373,310, filed on Aug. 13, 2010.

(51) Int. Cl.
    *G06F 12/00*      (2006.01)

(52) U.S. Cl.
    USPC .......................................... 711/129; 711/133

(58) Field of Classification Search
    USPC ................................................ 711/129, 133
    See application file for complete search history.

(56) References Cited

U.S. PATENT DOCUMENTS

| | | | |
|---|---|---|---|
| 2006/0004942 A1* | 1/2006 | Hetherington et al. | 711/3 |
| 2008/0040555 A1* | 2/2008 | Iyer et al. | 711/133 |
| 2010/0030964 A1* | 2/2010 | Aciicmez et al. | 711/119 |
| 2010/0250856 A1* | 9/2010 | Owen et al. | 711/128 |
| 2010/0275044 A1* | 10/2010 | Balakrishnan et al. | 713/320 |
| 2011/0145506 A1* | 6/2011 | Cherukuri et al. | 711/130 |

* cited by examiner

*Primary Examiner* — Hashem Farrokh
(74) *Attorney, Agent, or Firm* — Volpe and Koenig, P.C.

(57) ABSTRACT

A method and apparatus for partitioning a cache includes determining an allocation of a subcache out of a plurality of subcaches within the cache for association with a compute unit out of a plurality of compute units. Data is processed by the compute unit, and the compute unit evicts a line. The evicted line is written to the subcache associated with the compute unit.

20 Claims, 3 Drawing Sheets

CACHE PARTITIONING

CROSS REFERENCE TO RELATED APPLICATION

This application claims the benefit of U.S. Provisional Application No. 61/373,310, filed Aug. 13, 2010, which is incorporated herein by reference as if fully set forth.

FIELD OF INVENTION

This application is related to partitioning a cache.

BACKGROUND

In a data center, many processors may be operating and running a multitude of applications at any given time. A scheduler, or scheduling software, may determine on which processor an application is to be run. The processor may have access for storing information in a cache, such as a level 3 (L3) cache, that is associated with the processor. Additionally, each processor may include multiple compute units, (e.g., cores, core pairs, threads), that can run different applications within the processor concurrently. When an application is running on a processor, information relating to that application is stored in, and extracted out of, the L3 cache associated with that processor.

Since each application may have a different Quality of Service (QoS) requirement, when an application having a lower QoS requirement is running on one of the compute units, an application having a higher QoS requirement cannot be run efficiently on another compute unit within the processor because of sharing of resources in the L3 cache. Accordingly, the application scheduler will run that application on another processor which does not have a compute unit running an application having a lower QoS requirement. This imbalance in the QoS requirements of applications and sharing of compute units results in inefficient utilization of processors across the datacenter.

SUMMARY

A method and apparatus for partitioning a cache is disclosed. The method includes determining an allocation of a subcache out of a plurality of subcaches within the cache for association with a compute unit out of a plurality of compute units. Data is processed by the compute unit, and the compute unit evicts a line. The evicted line is written to the subcache associated with the compute unit.

In another embodiment, a method and apparatus are disclosed. The method includes writing an evicted line from a compute unit of a plurality of compute units to a subcache of a plurality of subcaches of a cache in accordance with an allocation of the plurality of subcaches to the plurality of compute units.

Another embodiment of a method and apparatus are disclosed. The method includes writing a line to a subcache of a plurality of subcaches of a cache. The subcache is associated with a compute unit of a plurality of compute units, and the line is associated with a process running on the compute unit.

Another embodiment of a method and apparatus are disclosed. The method includes determining an allocation of a subcache of a plurality of subcaches within a cache for association with at least one compute unit out of a plurality of compute units. A mapping table of a cache controller is updated to include a mapping of the association between the plurality of compute units and plurality of subcaches.

A computer-readable storage medium containing a first set of instructions is adapted to create a processor. The processor is configured to implement a second set of instructions that include an allocation determining code segment, a data processing code segment, a line evicting code segment, and a line writing code segment. The allocation determining code segment determines an allocation of at least one subcache of a plurality of subcaches within a cache for association with at least one compute unit out of a plurality of compute units. The data processing code segment processes data on the at least one compute unit. The line evicting code segment evicts a line from the at least one compute unit. The line writing code segment writes the line from the at least one compute unit to the at least one subcache associated with the at least one compute unit.

DETAILED DESCRIPTION OF THE EMBODIMENTS

In order to provide for multiple applications having, for example, different QoS requirements, to be run on compute units, such as a thread, core or core pair within the same processing unit, a cache, such as the L3 cache, may be partitioned into subcaches. Each compute unit, or a group of compute units, may be allocated one or more subcaches within the L3 cache in which to store data for an application running on the compute unit.

Figure 1:
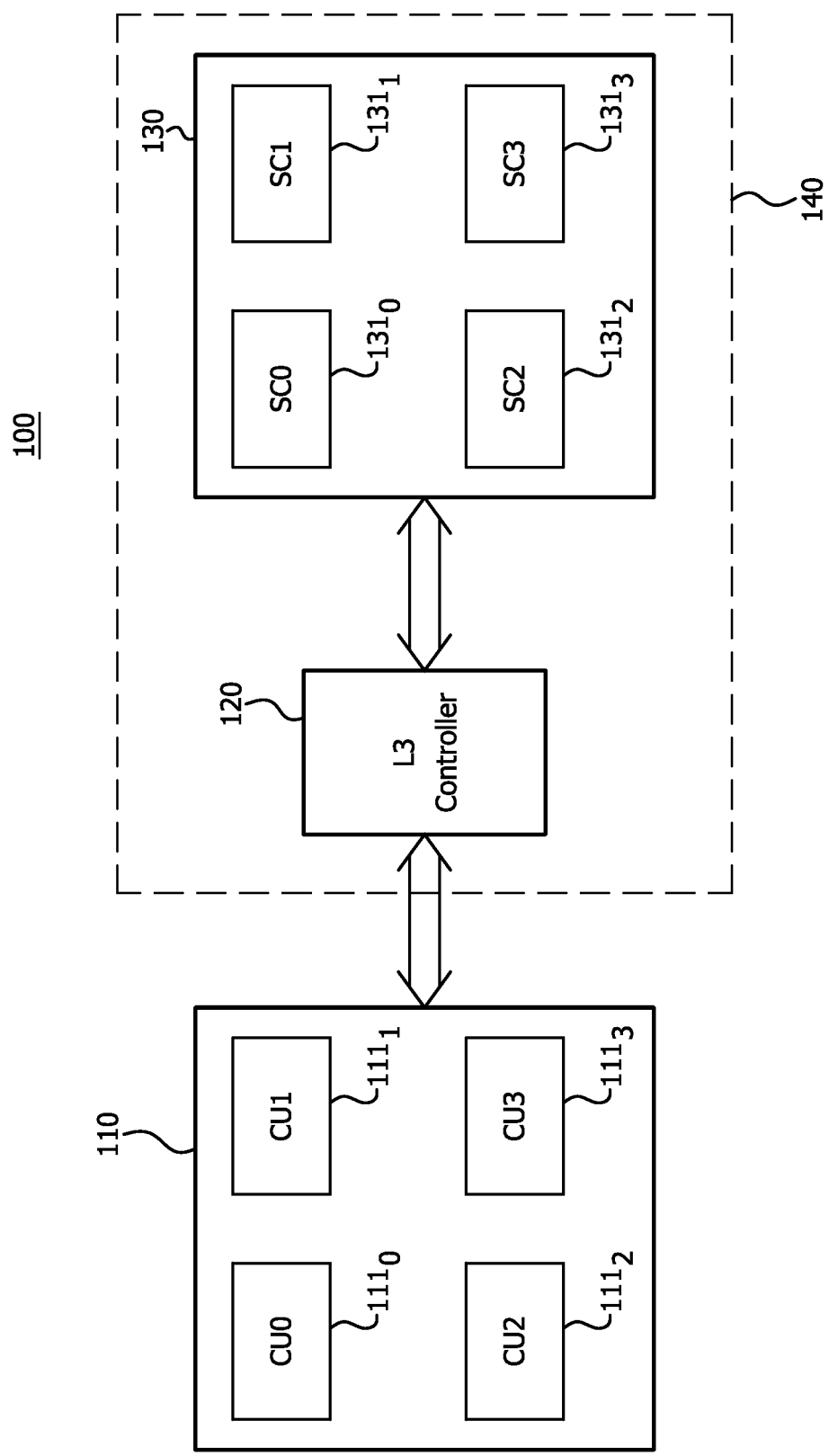
FIG. 1 is an example functional block diagram of a system including a processing unit and a level 3 (L3) entity.

FIG. 1 is an example functional block diagram of a system 100 including a processing unit 110 and an L3 entity 140. The processing unit 110 includes, for example, a plurality of compute units 111 (designated CU0 $111_0$, CU1 $111_1$, CU2 $111_2$, and CU3 $111_3$). The compute units 111 may be in the form of a core in the processing unit 110, a pair of cores (core pair) in the processing unit 110 or a thread. Although four compute units are shown for purposes of example, it should be noted that any number of compute units 111 may be included in processing unit 110.

The processing unit 110 is in communication with the L3 entity 140 via an L3 controller 120. The L3 entity 140 also includes an L3 cache 130, which may be partitioned into a number of subcaches 131. In the example shown in FIG. 1, the L3 cache is partitioned into four subcaches 131, (designated SC0 $131_0$, SC1 $131_1$, SC2 $131_2$, and SC3 $131_3$). However, the L3 cache 130 may be partitioned into any number of subcaches 131. The L3 cache 130 is in communication with, and controlled by, the L3 controller 120.

Figure 2:
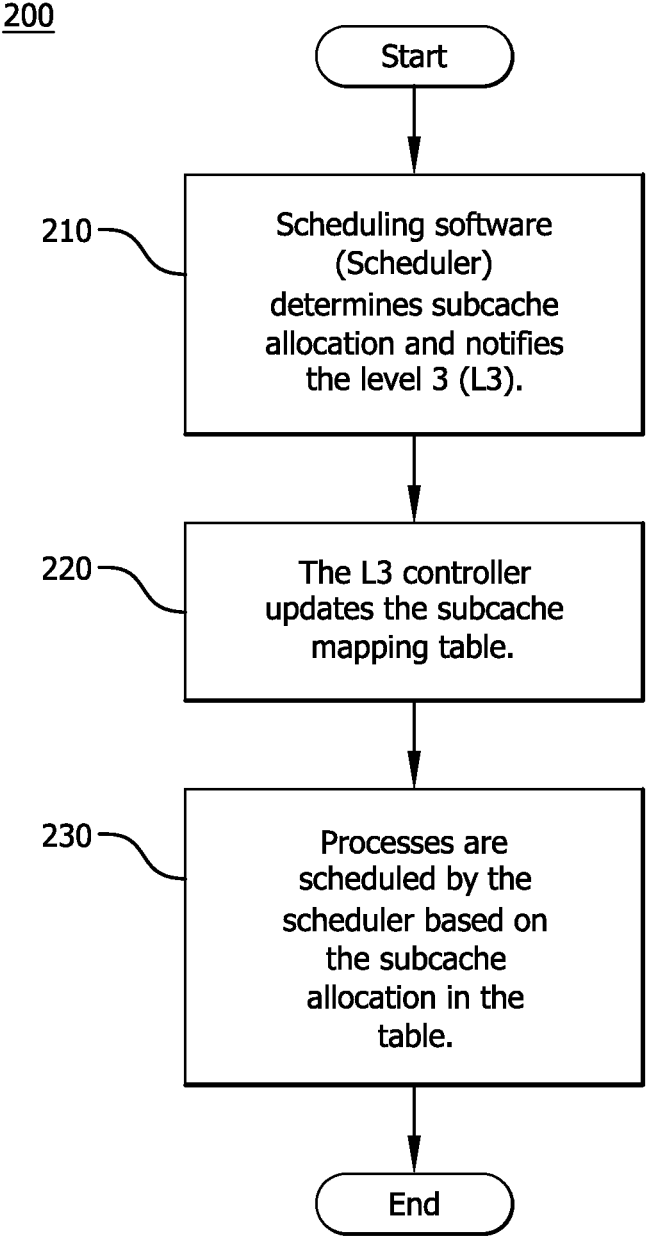
FIG. 2 is an example flow diagram of a method for determining an L3 cache partition/allocation for computing units.

FIG. 2 is an example flow diagram of a method 200 for determining an L3 cache partition/allocation for computing units 111. The method 200 may be performed in a data center, where a data center scheduler determines, based on characteristics such as QoS, an allocation of a subcache 131 to compute units 111. In an example data center or system, several layers may be present such as an application layer, a Kernel, and the hardware, (e.g., processing unit, memory). The Kernel may operate as a bridge between the application layer and the hardware where data is processed and stored.

In step 210 therefore, the data center scheduler, which may be scheduling software, determines a subcache allocation for the L3 cache 130 and notifies the L3 entity 140. This may be in the form of the application scheduling software informing the Kernel about the desired allocation, which then may pass the information through a peripheral component interconnect express (PCIe) register in communication with the Kernel to a North Bridge (NB), which may be in communication with the processing unit 110 and L3 controller 120. The NB informs the L3 controller 120 of the allocation. The determination may be made, for example, by the scheduler determining in real time what applications are to be run on which compute units 111, based upon the QoS of the applications. For example, the scheduler may desire to have a compute unit 111 executing an application having a high QoS requirement not be interfered with by applications running on other compute units. Accordingly, that compute unit 111 may be allocated a subcache, or subcaches, 131 such that another compute unit 111 is not permitted to access. Alternatively, the scheduler knowing the association of subcaches 131 to compute units 111, may determine to run an application having a high QoS on a compute unit 111 that has exclusive association to a particular subcache, or subcaches, 131. Likewise, it may be determined to have an application having a low QoS run on a compute unit 111 that does not have an association to a subcache, or subcaches, that are exclusively associated to that compute unit 111.

The L3 controller 120 updates a subcache mapping table (step 220) in accordance with the allocation received from the application scheduling software. The subcache mapping table includes information relating to the association between the subcaches 131 and their respective compute units 111, and may be stored in the L3 controller 120. One example mapping table is shown below as Table 1.

TABLE 1

|     | SC3 | SC2 | SC1 | SC0 |
| --- | --- | --- | --- | --- |
| CU0 | 0   | 0   | 1   | 1   |
| CU1 | 0   | 1   | 0   | 0   |
| CU2 | 1   | 0   | 0   | 0   |
| CU3 | 1   | 0   | 0   | 0   |

In the example shown above in Table 1, the four compute units 111 of FIG. 1 are mapped to the four subcaches 131. The mappings of compute units to subcaches may overlap completely, partially or not at all. For example, as shown in Table 1, CU0 is mapped to SC0 and SC1, CU1 is mapped to SC2, and CU2 and CU3 are both mapped to SC3. That is, the cache 130 is partitioned such that SC0 and SC1 are allocated for processes running on CU0, with no overlapping in the allocation to any other compute unit. SC2 is allocated for processes running on CU1, with no overlapping allocation to any other compute unit. SC3 is allocated to processes running on either CU2 or CU3. Accordingly, there is a complete overlap in the allocation for SC3. In addition, it is also possible to have a compute unit 131 not map to any subcache. For example, if CU3 were not allocated any subcache, a zero "0" bit would be included in the mapping table for each of the subcaches 131, (i.e., SC0, SC1, SC2, and SC3), in which case a line evicted from CU3 in this configuration would be sent directly to the main memory (not shown).

Once the mapping is complete, the scheduler then schedules processes to be run on the compute units 111 in accordance with the subcache mapping allocation (step 230). The scheduler may alter the mapping based on the data center applications needs in real time, and determine a new allocation of subcaches when the needs change.

Figure 3:
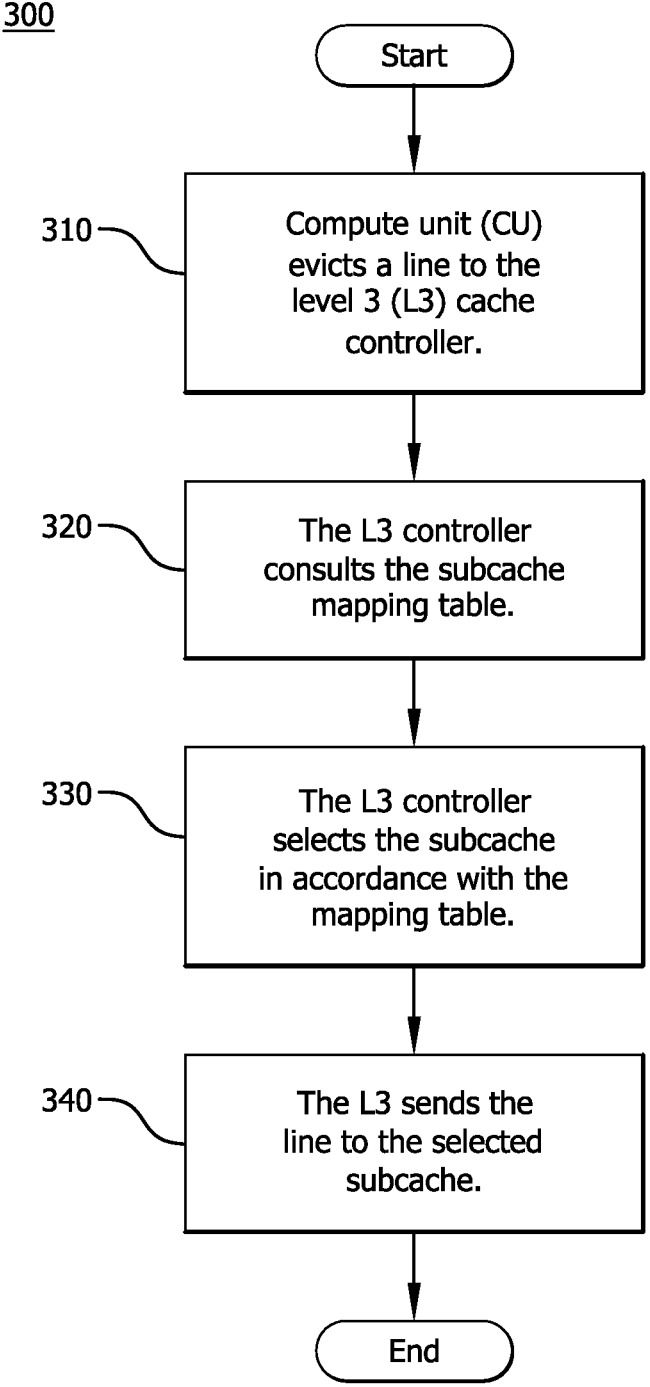
FIG. 3 is an example flow diagram of a method for storing data in a partitioned L3 cache.

Once the allocation is determined and the mapping table updated as in method 200, for example, the compute units 111 run processes and store data in accordance with their allotted subcache partition in the L3 cache 130. FIG. 3 is an example flow diagram of a method 300 for storing data in a partitioned L3 cache.

In step 310, a compute unit 111 running a process evicts a line (e.g., from the layer 2 (L2) cache) to the L3 cache 130. The L3 controller 120 consults the mapping table (e.g., Table 1 above) to determine which subcache(s) 131 is(are) allocated to that particular compute unit 111 (step 320). The L3 controller 120 then selects the subcache(s) 131 that is(are) allocated to that compute unit 111 in accordance with the mapping table (step 330). The line is then sent, or written, to the selected subcache 131 (step 340). When the line is to be read from the L3 cache 130, the read operation for the entire cache may remain unchanged since the location of the line to be extracted is known. Alternatively, the read operation may include reading the particular subcache 131 allocated to the compute unit 111.

Referring to Table 1 above, an example operation of methods 200 and 300 may be described. The data center scheduler determines, based on the QoS requirements of an application/process, that the application is to be run on CU0. The scheduler determines to partition the L3 cache 130 such that CU0 is allocated SC0 and SC1. The L3 controller 120 updates the mapping table to record that CU0 is allocated SC0 and SC1. The application is sent to CU0 for processes to be run and when CU0 evicts a line from its L2 cache, the L3 controller 120 reads the mapping table and determines that the line is to be written, or sent, to SC0 or SC1 and sends the line to that subcache 131. Since the read operation for the entire L3 cache 130 may remain unchanged, when the line is to be read out of the L3 cache 130, the L3 controller 120 reads the known location of the line in the L3 cache 130 to extract the line for processing by the compute unit CU0.

Additionally, or alternatively, a line may be written to the subcache 131 associated with a respective compute unit 111 without the line being evicted from the compute unit 111 first. For example, another entity may insert the line into the subcache 131 associated with the compute unit 111 where the line is associated with a process/application that is to be run on that associated compute unit 111. This example may include where the cache is not a victim cache but another cache associated with the particular compute unit 111.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

For example, as described above, the processor 110 may include four core pairs, (i.e., 8 cores), while the L3 cache 130 may be an 8 megabyte (MB) cache. The subcaches 131, for example, may be partitioned into 2 MB subcaches 131. However, any number of cores may be included in the processor 110 and the cache 130 may be of any capacity. Additionally, although the above embodiments are described with respect to an L3 cache and compute units within a processor, the methods described above may apply to any type of cache and compute unit.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A method, comprising:
    writing an evicted line from a first compute unit of a plurality of compute units to a first subcache of a plurality of subcaches of a shared cache in accordance with an allocation of the plurality of subcaches to the plurality of compute units, wherein the first subcache is associated with the first compute unit, and wherein a second subcache of the shared cache is not associated with any particular compute unit of the plurality of compute units.

2. The method of claim 1, wherein the first subcache is exclusively associated with the first compute unit and no other compute unit of the plurality of compute units.

3. The method of claim 1 wherein the association of the first subcache with the first compute unit is performed based upon a quality of service (QoS) requirement of an application to be processed on the first compute unit.

4. The method of claim 1, further comprising informing a cache controller of the allocation of the first subcache.

5. The method of claim 4 wherein the cache controller updates a mapping table, the mapping table including a mapping of the association between the plurality of compute units and plurality of subcaches.

6. The method of claim 5 wherein writing the line from the first compute unit to the first subcache associated with the first compute unit further comprises accessing the mapping table to determine the first subcache associated with the first compute unit.

7. The method of claim 6 wherein the cache controller writes the line to the first subcache associated with the first compute unit.

8. The method of claim 1, further comprising extracting the written line from the first subcache.

9. The method of claim 1 wherein the shared cache is a level 3 (L3) cache.

10. The method of claim 1 wherein the first compute unit includes a core or a core pair.

11. The method of claim 1 wherein at least one compute unit other than the first compute unit is not allocated any subcache.

12. A method, comprising:
    writing a line to a first subcache of a plurality of subcaches of a shared cache, the first subcache associated with a first compute unit of a plurality of compute units, wherein the line is associated with a process running on the first compute unit, and wherein a second subcache of the shared cache is not associated with any particular compute unit of the plurality of compute units.

13. A method comprising:
    determining an allocation of a first subcache of a plurality of subcaches within a shared cache for association with a first compute unit out of a plurality of compute units, wherein the first subcache is associated with the first compute unit and not associated with any other compute unit of the plurality of compute units, and wherein a second subcache of the shared cache is not associated with any particular compute unit of the plurality of compute units; and
    updating a mapping table of a cache controller to include a mapping of the association between the plurality of compute units and plurality of subcaches.

14. An apparatus, comprising:
    a plurality of compute units;
    a cache controller; and
    a shared cache partitioned into a plurality of subcaches, a first subcache of the plurality of subcaches being associated with a first compute unit of the plurality of compute units, and wherein a second subcache of the shared cache is not associated with any particular compute unit of the plurality of compute units;
    wherein upon a line being evicted from a process running on the first compute unit is written to the first subcache associated with the first one compute unit.

15. The apparatus of claim 14 wherein the cache controller is configured to receive a subcache allocation indicating an association of the first subcache with the respective first compute unit.

16. The apparatus of claim 15 wherein the cache controller is further configured to determine upon the eviction of the line from the first compute unit the associated subcache with the first compute unit and write the line to the associated subcache.

17. The apparatus of claim 14 wherein the first compute unit includes a core or core pair.

18. The apparatus of claim 14 wherein the shared cache is a level 3 (L3) cache.

19. The apparatus of claim 14 wherein the cache controller is further configured to read the entire shared cache to extract a line written to the associated at least one subcache.

20. A non-transitory computer-readable storage medium containing a first set of instructions, comprising:
    an allocation determining code segment for determining an allocation of a first subcache of a plurality of subcaches within a shared cache for association with a first compute unit out of a plurality of compute units, and wherein a second subcache of the shared cache is not associated with any particular compute unit of the plurality of compute units;
    a data processing code segment for processing data on the first compute unit;
    a line evicting code segment for evicting a line from the first compute unit; and
    a line writing code segment for writing the line from the first compute unit to the first subcache associated with first compute unit.

* * * * *

UNITED STATES PATENT AND TRADEMARK OFFICE
CERTIFICATE OF CORRECTION

| | | |
|---|---|---|
| PATENT NO. | : 8,606,999 B2 | |
| APPLICATION NO. | : 12/871108 | |
| DATED | : December 10, 2013 | |
| INVENTOR(S) | : Donley et al. | |

It is certified that error appears in the above-identified patent and that said Letters Patent is hereby corrected as shown below:

In the Claims

In Claim 14, at Column 6, Line 29; after the word "first", please delete the word "one".

Signed and Sealed this
Twenty-eighth Day of February, 2023

Katherine Kelly Vidal
*Director of the United States Patent and Trademark Office*